United States Patent
Watanabe

(10) Patent No.: US 7,944,170 B2
(45) Date of Patent: May 17, 2011

(54) WIRELESS TRANSMISSION DEVICE

(75) Inventor: Jun Watanabe, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 617 days.

(21) Appl. No.: 12/021,099

(22) Filed: Jan. 28, 2008

(65) Prior Publication Data

US 2008/0180057 A1   Jul. 31, 2008

(30) Foreign Application Priority Data

Jan. 30, 2007   (JP) ................... 2007-019826

(51) Int. Cl.
*H02J 7/00* (2006.01)
(52) U.S. Cl. .......... 320/108; 320/113; 320/115
(58) Field of Classification Search .......... 320/108, 320/113, 114, 115
See application file for complete search history.

(56) References Cited

U.S. PATENT DOCUMENTS

| | | | | |
|---|---|---|---|---|
| 7,375,494 B2 * | 5/2008 | Daniel et al. | ................ | 320/112 |
| 2004/0206825 A1 * | 10/2004 | Schmidt et al. | .......... | 235/462.46 |
| 2006/0202660 A1 * | 9/2006 | Chang | ........................... | 320/115 |
| 2006/0274910 A1 * | 12/2006 | Schul et al. | ................... | 381/334 |
| 2007/0096691 A1 * | 5/2007 | Duncan et al. | ................ | 320/114 |

FOREIGN PATENT DOCUMENTS

| | | |
|---|---|---|
| CN | 2620886 Y | 6/2004 |
| JP | A-10-260781 | 9/1998 |
| JP | 3090068 | 4/2002 |
| JP | A-2005-316859 | 11/2005 |

OTHER PUBLICATIONS

English Translation of Chinese Office Action Dated May 22, 2009.

* cited by examiner

*Primary Examiner* — Edward Tso
*Assistant Examiner* — M'Baye Diao
(74) *Attorney, Agent, or Firm* — Knobbe, Martens Olson & Bear LLP

(57) ABSTRACT

According to one embodiment, a wireless transmission device includes: a transmitter that transmits a signal to an external device; an internal rechargeable battery that supplies a power to the transmitter; a connector to which an external rechargeable battery inserted from outside is connected; and a controller that controls the internal rechargeable battery and the external rechargeable battery so that the external rechargeable battery recharges the internal rechargeable battery when the external rechargeable battery is connected to the connector, wherein the external rechargeable battery is charged when the transmitter transmits the signal to the external device.

8 Claims, 5 Drawing Sheets

BEFORE RECEIVING

AFTER RECEIVING

WIRELESS TRANSMISSION DEVICE

CROSS-REFERENCE TO RELATED APPLICATIONS

This application is based upon and claims the benefit of priority from JP-A-2007-019826, filed Jan. 30, 2007, the entire contents of which are incorporated herein by reference.

BACKGROUND

1. Field

One embodiment of the invention relates to a wireless transmission device, and more particularly to a wireless transmission device that can receive an external rechargeable battery recharged at the time of manipulation and has a rechargeable battery recharged by electric power supplied from the received rechargeable battery.

2. Description of the Related Art

Conventionally, there is known a wireless transmission device including a wireless mouse that has a battery serving as an internal power source and transmits user's manipulation signal by wireless and a receiver that is connected to a PC (Personal Computer), receives the mouse manipulation signal transmitted from the wireless mouse, and outputs the received mouse manipulation signal to the PC (for example, see Japanese Examined Utility Model Registration Application Publication No. 3090068).

According to the wireless transmission device, the receiver can be contained in the wireless mouse. Therefore, the wireless mouse is excellent in portability at the time when the wireless mouse is intended to be used in other PC.

In the past, the known wireless transmission device should be connected to a charging cradle in order to be charged. Accordingly, the known device can not be charged while a PC is used, and a user may forget the charging operation even when the user plans to do the charging operation after using the PC.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a wireless transmission device includes a transmitter within a housing, the transmitter configured to transmits a signal to an external device; an internal rechargeable battery within the housing, the internal rechargeable battery configured to supply a power to the transmitter; a connector associated with the housing, the connector configured to connect to an external rechargeable battery; an external rechargeable battery configured to recharge the internal battery while the external battery is connected to the connector; and a controller configured to control recharge of the internal rechargeable battery by the external rechargeable battery, wherein the external rechargeable battery is configured to be charged while the external rechargeable battery is connected to the external device, and while the transmitter transmits the signal to the external device.

Hereinafter, a wireless transmission device according to embodiments of the invention will be described in detail with reference to the drawings.

First Embodiment

Configuration of First Embodiment

Figure 1:
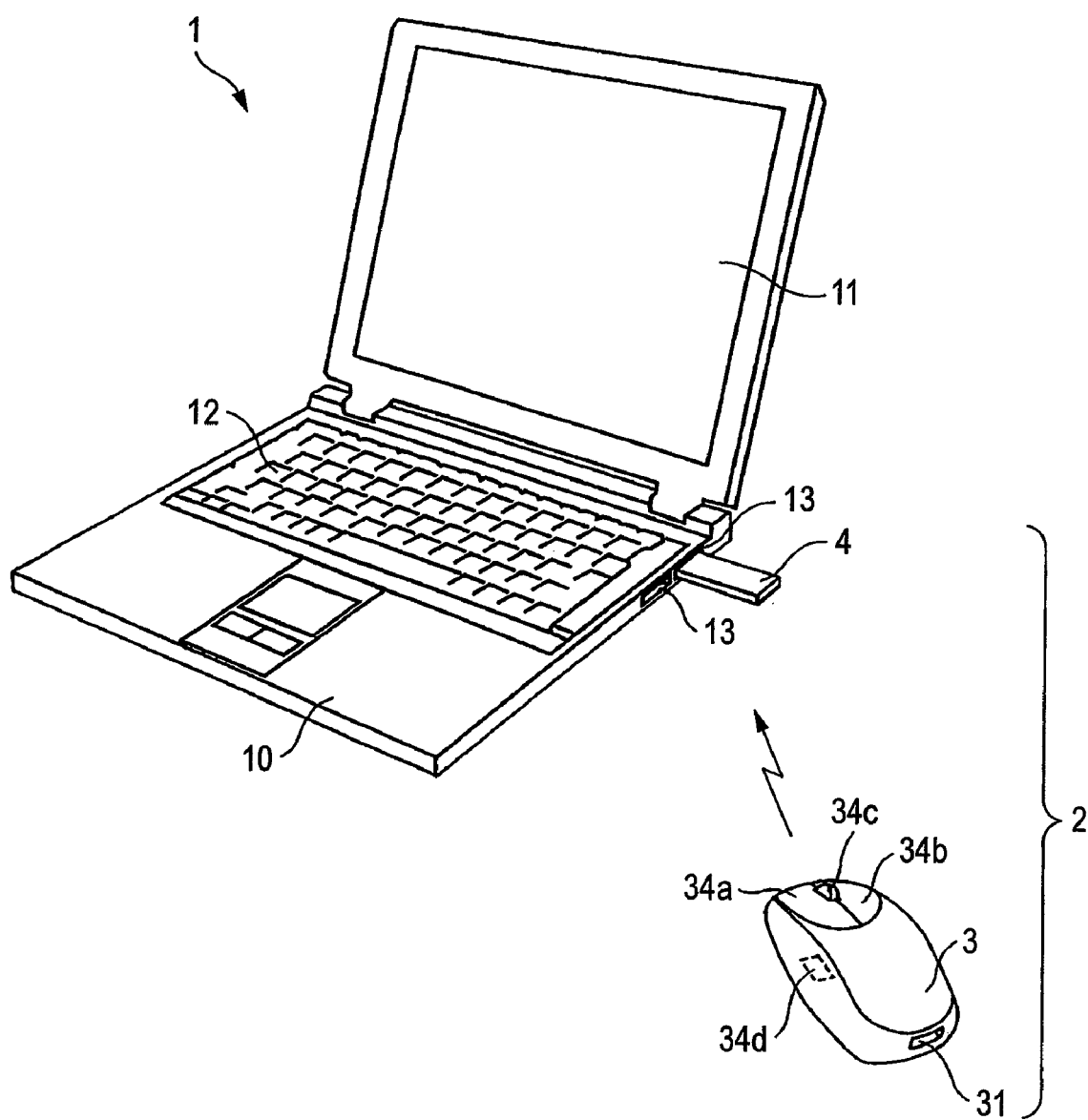
FIG. 1 is an exemplary schematic view illustrating a situation in use of a wireless mouse according to a first embodiment of the invention.

FIG. 1 is an exemplary schematic view illustrating a situation in use of a wireless mouse according to a first embodiment of the invention.

A PC 1 serving as an external device has a main body 10 including various electronic parts such as a HD (Hard Disk) and a memory, a screen 11 displaying an image and the like, a key board 12 receiving user's input, and a PC side USB connector section 13 capable of connecting with a cable based on USB standard. The external device is not limited to the PC, and it is also possible to employ, for example, a television, a game machine, and the other electric home appliances.

A wireless mouse 2 serving as a wireless transmission device includes a wireless mouse body 3, or housing, and a receiver/rechargeable battery 4. The wireless mouse body 3 has a mouse side USB connector section 31 capable of containing the receiver/rechargeable battery 4 and connecting with a connector based on USB standard and an input section including a left button 34a, a right button 34b, a wheel 34c, and a sensor 34d.

In the embodiment, a place for containing the receiver/rechargeable battery 4 is the rear of the wireless mouse body 3. However, the place is not limited to this and the front and the side thereof also may be possible.

The left button 34a is mainly used in selection of images such as text displayed on the screen 11. When a pointer is overlapped on an image intended to be selected, a user can select the image by pressing the left button 34a.

When the right button 34b is pressed by a user, a list of processes for the selected image is displayed and a process can be executed by a manipulation of selecting the process from the list.

When the wheel 34c is rotated in a circumferential direction or is bent in right and left directions, the image displayed on the screen 11 can be scrolled with respect to the screen 11 in up and down directions or right and left directions.

The sensor 34d is disposed on a lower face of the wireless mouse body 3. For example, optical type sensor includes a light emitting section (which is not shown in the drawings)

using a LED (Light Emitting Diode) and a light receiving section reading light reflected from a table, a mouse pad, or the like. By reading the reflection of light, the optical type sensor detects a movement amount (which includes time, a speed, a direction, and the like) of the wireless mouse body 3 and the information of the movement amount is transmitted as a manipulation signal to the PC 1. Then, the PC 1 processes the manipulation signal and makes the pointer displayed on the screen 11 of the PC 1 move corresponding to the movement amount of the wireless mouse body 3.

The receiver/rechargeable battery 4 can be connected to the PC side USB connector section 13 or the mouse side USB connector section 31, receives the manipulation signal from the wireless mouse body 3, transmits the signal to the PC 1, and charges the internal rechargeable battery with the power supplied from the PC 1.

Figure 2:
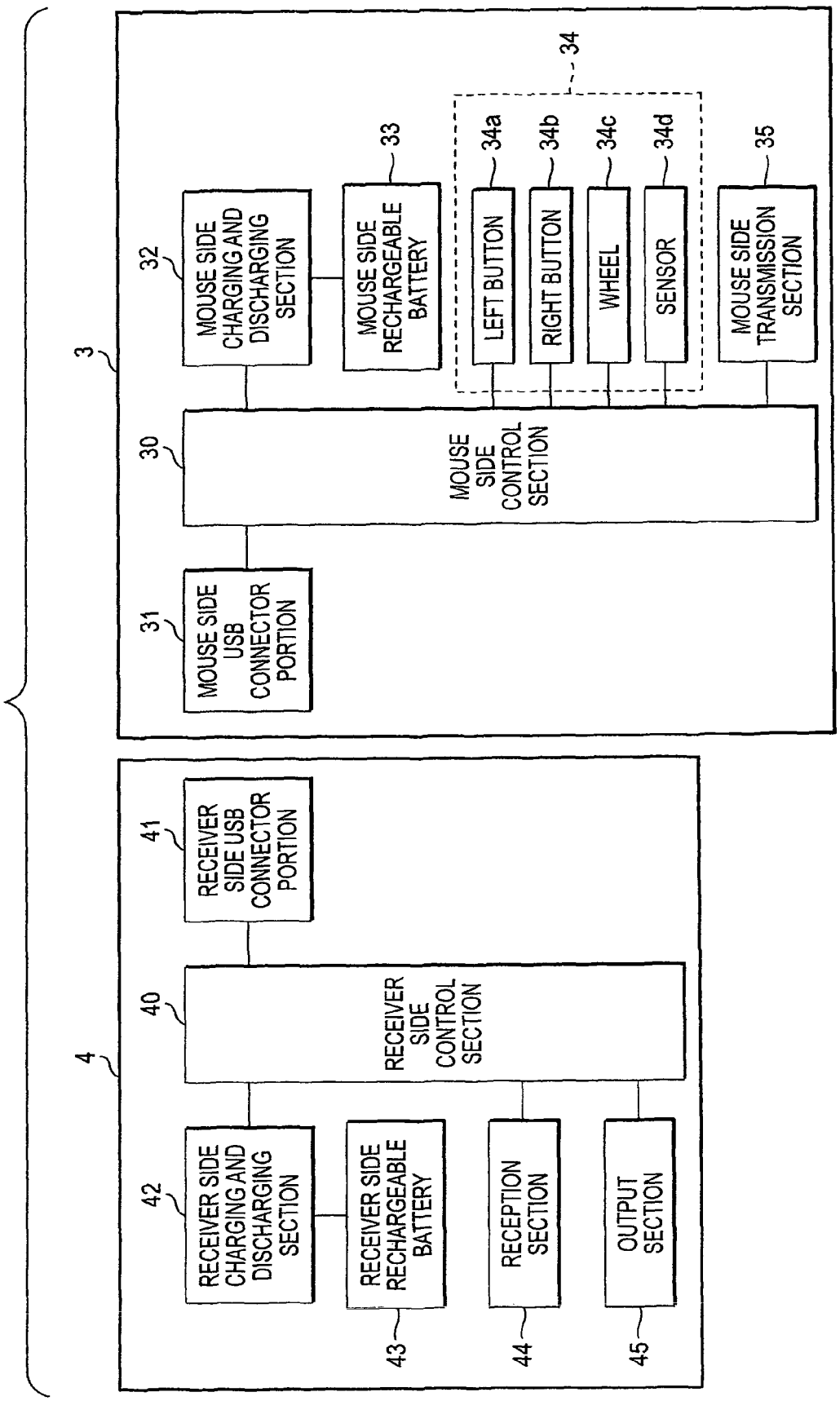
FIG. 2 is an exemplary block diagram illustrating a wireless mouse body and a receiver/rechargeable battery according to the first embodiment of the invention.

FIG. 2 is an exemplary block diagram illustrating a wireless mouse body and a receiver/rechargeable battery according to the first embodiment of the invention.

(Structure of Wireless Mouse Body)

The wireless mouse body 3 has the mouse side control section 30 integrally controlling the sections, the mouse side USB connector section 31 serving as a connection section capable of connecting with a connector based on USB standard and containing the receiver/rechargeable battery 4, a mouse side charging and discharging section 32 managing the rechargeable battery, a mouse side rechargeable battery 33 serving as an internal rechargeable battery supplying or charging electric power, the input section 34 including the left button 34a, the right button 34b, the wheel 34c, and the sensor 34d and making the manipulation signal based on user's manipulation, and a mouse side transmission section 35 transmitting the manipulation signal generated from the input section 34 to the receiver/rechargeable battery 4.

(Structure of Receiver/Rechargeable Battery)

The receiver/rechargeable battery 4 has a receiver side control section 40 integrally controlling the sections, a receiver side USB connector section 41 capable of connecting with a connector based on USB standard, a receiver side charging and discharging section 42 managing the rechargeable battery, a receiver side rechargeable battery 43 serving as an external rechargeable battery that supplies and charges electric power, a reception section 44 receiving the manipulation signal transmitted from the wireless mouse body 3, and an output section 45 outputting the received manipulation signal to the external device.

(Operation of Wireless Mouse)

Figure 3:
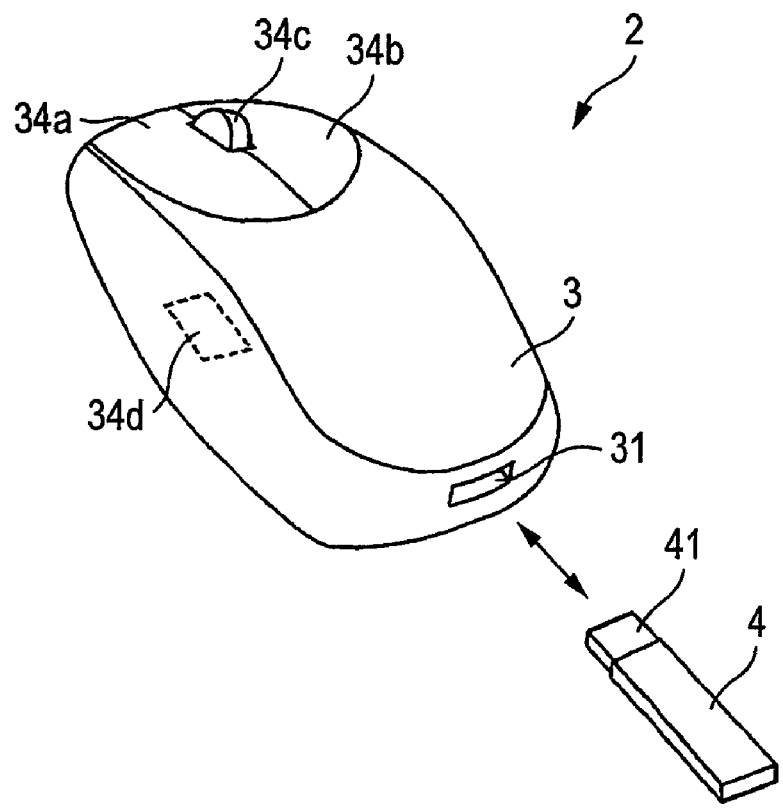
FIG. 3(a) is an exemplary view illustrating a state where the receiver/rechargeable battery is not contained in the wireless mouse body according to the first embodiment of the invention.
FIG. 3(b) is an exemplary view illustrating a state where the receiver/rechargeable battery is contained in the wireless mouse body according to the first embodiment of the invention.
Figure 3:
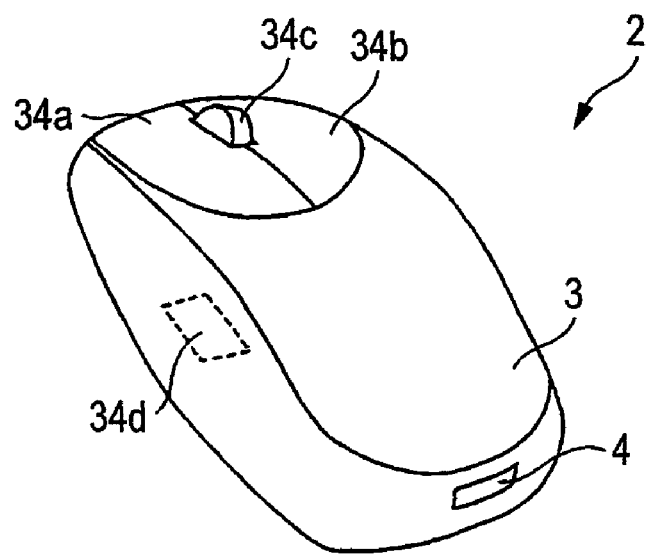

FIG. 3(a) is an exemplary view illustrating a state where the receiver/rechargeable battery is not contained in the wireless mouse body according to the first embodiment of the invention. FIG. 3(b) is an exemplary view illustrating a state where the receiver/rechargeable battery is contained in the wireless mouse body according to the first embodiment of the invention.

A user takes a seat at a desk on which PC 1 is set, and activates the PC 1 by releasing a sleep state of the PC 1. The receiver/rechargeable battery 4 is assumed to be previously connected to the PC side USB connector section 13 of the PC 1.

When the user moves the wireless mouse body 3, the mouse side control section 30 of the wireless mouse body 3 is determined that the wireless mouse body 3 moves, based on the information of movement amount received from the sensor 34d, and instructs the mouse side charging and discharging section 32 to supply electric power used under normal conditions from the mouse side rechargeable battery 33.

When the user moves the wireless mouse body 3 while looking at the image displayed on the screen 11, the sensor 34d makes the movement amount information by reading the light reflection. In this case, the mouse side control section 30 transmits the movement amount information as the manipulation information from the mouse side transmission section 35 to the receiver/rechargeable battery 4.

The receiver/rechargeable battery 4 receives the manipulation information by using the reception section 44. The receiver side control section 40 outputs the manipulation information received in the PC 1 connected to the output section 45.

When the PC 1 receives the manipulation information from the receiver/rechargeable battery 4, the PC 1 processes the information and moves the pointer displayed on the screen 11 so as to correspond the movement amount of the wireless mouse body 3.

The user makes the PC 1 the sleep state after finishing the manipulation, and inserts the receiver/rechargeable battery 4 to the mouse side USB connector section 31 shown in FIG. 3(a). As a result, since the receiver/rechargeable battery 4 is contained in the wireless mouse body 3, the user can easily carry the wireless mouse body 3 and the receiver/rechargeable battery 4.

As shown in FIG. 3(b), the receiver/rechargeable battery 4 is contained in the wireless mouse body 3. In this case, the receiver side USB connector section 41 is connected to the mouse side USB connector section 31, and thus the wireless mouse body 3 can save electric power.

When the connection between the receiver side USB connector section 41 and the mouse side USB connector section 31 is detected, the receiver side control section 40 of the receiver/rechargeable battery 4 contained in the wireless mouse body 3 instructs the receiver side charging and discharging section 42 to supply electric power of the receiver side rechargeable battery 43 to the mouse side rechargeable battery 33.

The receiver side charging and discharging section 42 supplies electric power to the mouse side rechargeable battery 33 based on the instruction from the receiver side control section 40.

The mouse side control section 30 to which electric power is supplied instructs the mouse side charging and discharging section 32 to charge the mouse side rechargeable battery 33 with electric power. The mouse side charging and discharging section 32 charges the mouse side rechargeable battery 33 with the supplied electric power.

When the charging operation of the mouse side rechargeable battery 33 is finished, the mouse side charging and discharging section 32 instructs the receiver side charging and discharging section 42 of the receiver/rechargeable battery 4 to finish supplying electric power from the receiver side rechargeable battery 43.

The receiver side charging and discharging section 42 finishes supplying the electric power from the receiver side rechargeable battery 43 based on the instruction of the mouse side charging and discharging section 32.

Then, the user activates the PC 1 by releasing the sleep state of the PC 1, and takes out the receiver/rechargeable battery 4 contained in the wireless mouse body 3. Then the user connects the receiver/rechargeable battery 4 to the PC side USB connector section 13 of the PC 1.

The method of taking out the receiver/rechargeable battery 4 contained in the wireless mouse body 3 is not limited to above-described method. Accordingly, it may be configured to employ an apparatus that springs out when slightly pushing the receiver/rechargeable battery 4. In addition, it may be configured to form a concave portion in the vicinity of the insertion port of the mouse side USB connector section 31 and to be able to pull the receiver/rechargeable battery 4 by user's hand. It may be also configured to employ an apparatus in which a discharging button is formed and the receiver/rechargeable battery 4 can be discharged by pressing the button.

The receiver/rechargeable battery 4 connected to the PC side USB connector section 13 of the PC 1, when receiving the electric power from the PC 1, instructs the receiver side charging and discharging section 42 to charge the receiver side rechargeable battery 43. By repeating the operations, the mouse side rechargeable battery 33 of the wireless mouse body 3 is constantly charged.

Advantage of First Embodiment

In the wireless mouse 2 according to the above-described first embodiment, the receiver side rechargeable battery 43 of the receiver/rechargeable battery 4 is charged while the user does work in a state where the receiver/rechargeable battery 4 is connected to the PC 1. In addition, the mouse side rechargeable battery 33 of the wireless mouse body 3 is charged while the user moves the PC 1 together with the receiver/rechargeable battery 4 inserted to the wireless mouse body 3 and until user does work again. Therefore, it is possible to prevent the user from forgetting to charge the wireless mouse, and portability is also excellent since the receiver/rechargeable battery 4 can be contained in the wireless mouse body 3.

Second Embodiment

Figure 4:
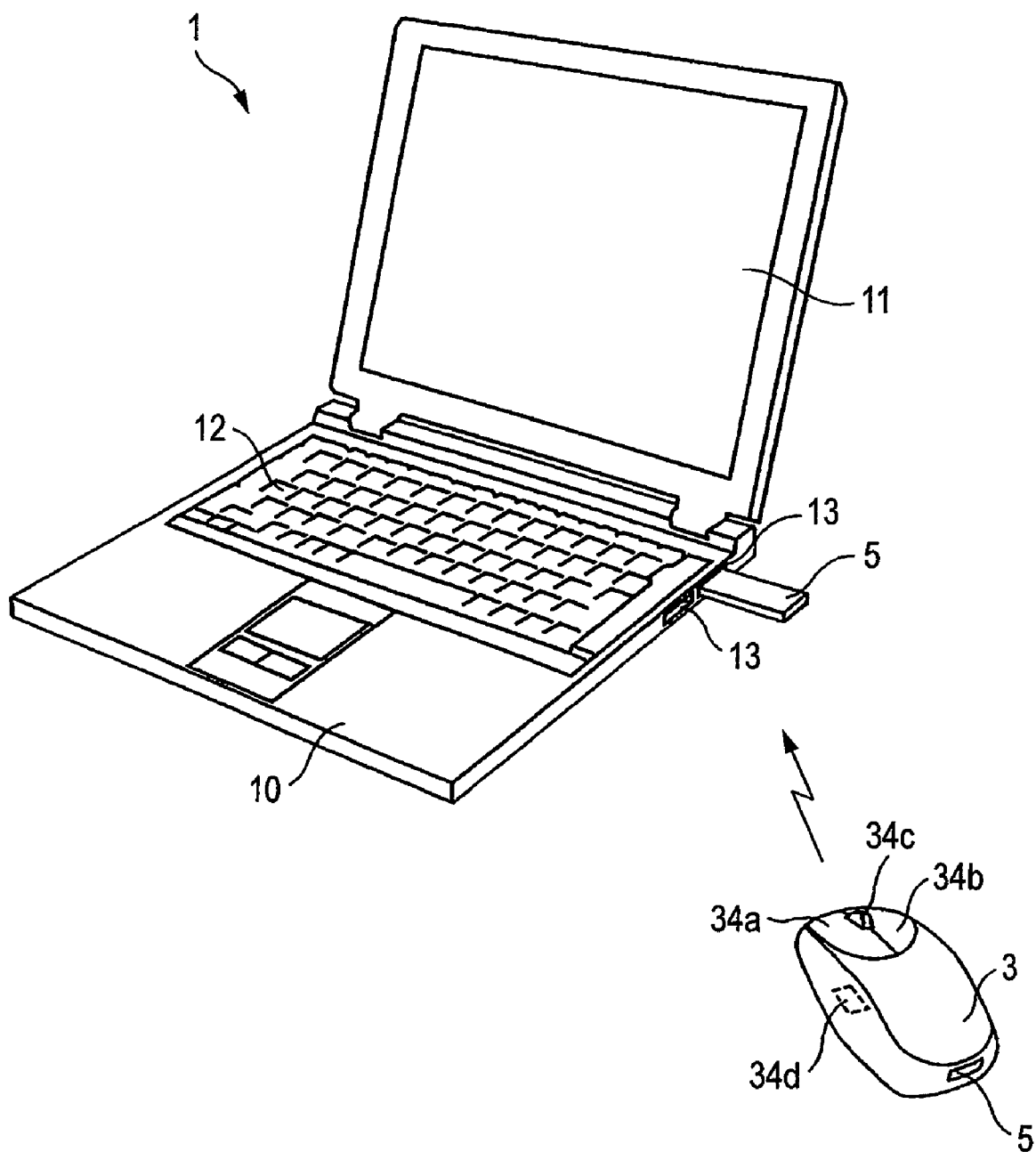
FIG. 4 is an exemplary schematic view illustrating a situation in use of a wireless mouse according to a second embodiment of the invention.

FIG. 4 is an exemplary schematic view illustrating a situation in use of a wireless mouse according to a second embodiment of the invention. The case where the PC 1 has a reception function of the same standard as the wireless mouse and employs an external rechargeable battery, which does not have the reception function, instead of the receiver/rechargeable battery 4 will be described. In the case where the same configuration and function as the first embodiment exists in the following description, those elements will be referenced by the same reference numerals.

For example, a user prepares two external rechargeable batteries 5. One thereof is connected to the wireless mouse body 3, and the other one is connected to the PC side USB connector section 13. The external rechargeable battery 5 connected to the PC side USB connector section 13 is charged by the electric power supplied from the PC 1.

The external rechargeable battery 5 may notify an end of the charging operation to a user by lighting a LED lamp disposed on the external rechargeable battery 5 not shown in the drawings, and the invention is not limited to this.

For example, when a user wants to use the wireless mouse body 3 in other PC, the external rechargeable battery 5 is alternately connected to the wireless mouse body 3, and thus it is possible to prevent the user from forgetting to charge the rechargeable battery.

In this case, even when the external rechargeable battery 5 is just one, the external rechargeable battery 5 is connected to the PC side USB connector section 13 of the PC 1, and thus the external rechargeable battery 5 is charged by electric power supplied from the PC 1. Therefore, it is possible to prevent the user from forgetting to perform the charging operation.

According to the embodiment, the external rechargeable battery 5 is connected to the PC 1, the receiver/rechargeable battery 4 may be connected thereto.

Third Embodiment

Figure 5:
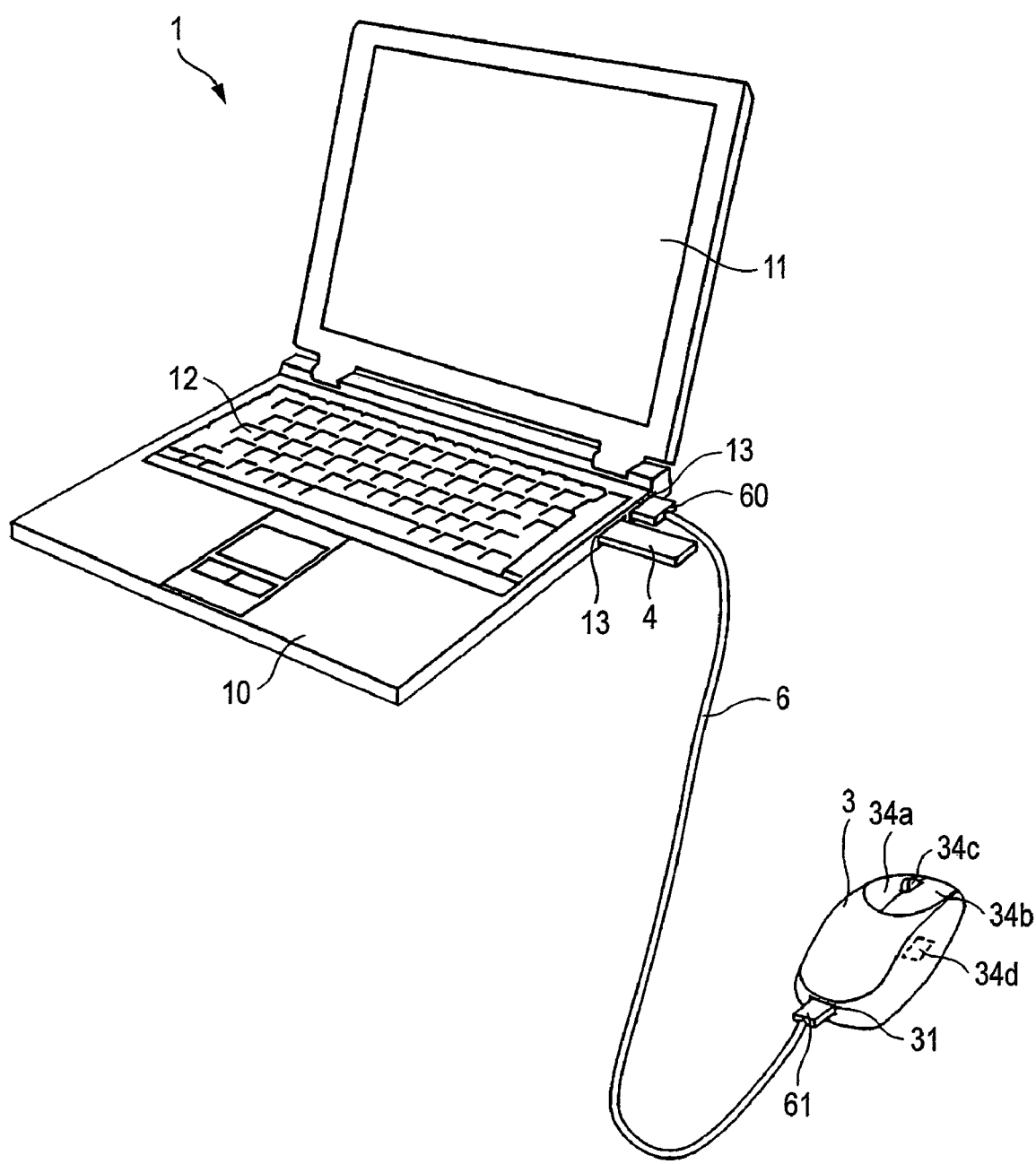
FIG. 5 is an exemplary view illustrating a state where a wireless mouse body is connected to a PC by a USB cable according to a third embodiment of the invention.

FIG. 5 is an exemplary view illustrating a state where a wireless mouse body is connected to a PC by a USB cable according to a third embodiment of the invention.

The USB cable 6 has a first USB cable connector section 60 and a second USB cable connector section 61, which are connected to the PC side USB connector section 13 and the mouse side USB connector section 31, respectively.

For example, capacity of the mouse side rechargeable battery 33 of the wireless mouse body 3 is insufficient, and so the wireless mouse 2 does not operate. In this case, the first USB cable connector section 60 is connected to the PC side USB connector section 13 and the second USB cable connector section 61 is connected to the mouse side USB connector section 31, and thus it is possible to use the wireless like a normal mouse. At this time, the manipulation signal may be transmitted from the USB cable 6 to the PC 1, and may be transmitted from the mouse side transmission section 35 to the receiver/rechargeable battery 4 by wireless.

At this time, the user connects the receiver/rechargeable battery 4 in which capacity of the receiver side rechargeable battery 43 is insufficient to the PC side USB connector section 13 that is not connected with the USB cable 6.

When electric power is supplied from the PC 1 to the receiver side control section 40 of the receiver/rechargeable battery 4, the control section instructs the receiver side charging and discharging section 42 to charges the receiver side rechargeable battery 43, and the receiver side charging and discharging section 42 charges the receiver side rechargeable battery 43 until the charging operation of the receiver side rechargeable battery 43 is finished. At this time, end of the charging operation may be notified to a user by lighting a LED lamp disposed on the receiver/rechargeable battery 4 not shown in the drawings, and the invention is not limited to this.

In addition, the mouse side control section 30 of the wireless mouse body 3 instructs the mouse side charging and discharging section 32 to charge the mouse side rechargeable battery 33 with the electric power supplied from the PC 1, and the mouse side charging and discharging section 32 charges the mouse side rechargeable battery 33.

When the mouse side rechargeable battery 33 of the wireless mouse body 3 is completely charged or is sufficiently charged in order to operate the wireless mouse body 3, the user separates the connected USB cable 6, and can do work by wireless.

Here, end of the charging operation of the mouse side rechargeable battery 33 may be notified to a user by lighting a LED lamp disposed on the wireless mouse body 3 not shown in the drawings, and the invention is not limited to this.

Accordingly, even when capacity of the mouse side rechargeable battery 33 of the wireless mouse body 3 is insufficient in the course of user's work, the user can continue the work by connecting the USB cable 6.

According to above-described embodiment, the connector and the cable are not limited to the USB standard and may be based on any standards such as IEEE 1394 and HDMI, and the invention is not limited to this. In addition, the shape of the USB connector may be any one of A type and B type and may be combination of them, and is not limited to this.

In addition, according to the above-described embodiment, the wireless mouse 2 is an example of the wireless transmission device, but the wireless transmission device may be a tablet, a key board, a joystick, and a game controller, and is not limited to this.

In addition, the invention is not limited to the above-described embodiment, may be modified in various forms without departing from or changing the technical spirit of the invention.

As described with reference to the embodiment, there is provided a wireless transmission device that is excellent in portability and prevents a user from forgetting to perform the charging operation.

What is claimed is:

1. A wireless transmission device comprising:
   a main body comprising:
      a housing;
      a first connector associated with the housing;
      a transmitter within the housing, the transmitter configured to wirelessly transmit a signal for an external device; and
      a first battery within the housing, the first battery configured to supply power to the transmitter;
   a wireless receiver unit comprising:
      a casing formed to be attachable to the housing of the main body;
      a second connector associated with the casing, the second connector configured to be connectable with the first connector and with a third connector associated with the external device;
      a receiver within the casing, the receiver configured to wirelessly receive the signal sent from the transmitter to convey it to the external device when the second connector is connected to the third connector associated with the external device; and
      a second battery within the casing, the second battery configured to be charged by the external device when the second connector is connected to the third connector associated with the external device, and to recharge the first battery while the second connector is connected to the first connector.

2. The wireless transmission device of claim 1, wherein the first connector is compliant with the USB standard, the IEEE 1394 standard, and/or the HDMI standard.

3. The wireless transmission device of claim 1, wherein the second connector is compliant with the USB standard, the IEEE 1394 standard, and/or the HDMI standard.

4. The wireless transmission device of claim 1, wherein the first connector is configured to connect to the third connector associated with the external device with a cable, and wherein the transmitter is configured to transmit the transmission signal to the external device through the first connector and the cable when the first connector is connected to the third connector via the cable.

5. The wireless transmission device of claim 4, wherein the cable is compliant with the USB standard, the IEEE 1394 standard, and/or the HDMI standard.

6. The wireless transmission device of claim 1, wherein the first connector is configured to connect to the third connector associated with the external device with a cable, and wherein the first battery is configured so that the external device recharges the first battery through the connector and the cable when the first connector is connected to the third connector via the cable.

7. The wireless transmission device according to claim 6, wherein the cable is compliant with the USB standard, the IEEE 1394 standard, and/or the HDMI standard.

8. The wireless transmission device according to claim 1, wherein the wireless transmission device comprises a computer mouse.

* * * * *